US012782186B2

(12) United States Patent
Nagao et al.

(10) Patent No.: US 12,782,186 B2
(45) Date of Patent: Nov. 3, 2026

(54) SYSTEMS, METHODS AND TECHNIQUES FOR NON-LIQUID MATERIAL MONITORING

(71) Applicant: Dober Chemical Corp., Woodridge, IL (US)

(72) Inventors: Blaine Taylor Yoshio Nagao, Irving, TX (US); Brian Bergin, Oak Lawn, IL (US); Dan Dobrez, Woodridge, IL (US)

(73) Assignee: Dober Chemical Corp., Woodridge, IL (US)

( * ) Notice: Subject to any disclaimer, the term of this patent is extended or adjusted under 35 U.S.C. 154(b) by 646 days.

(21) Appl. No.: 18/197,984

(22) Filed: May 16, 2023

(65) Prior Publication Data

US 2023/0366717 A1 Nov. 16, 2023

Related U.S. Application Data

(60) Provisional application No. 63/342,385, filed on May 16, 2022.

(51) Int. Cl.
*G01F 23/22* (2006.01)
*G01F 23/80* (2022.01)

(52) U.S. Cl.
CPC ............ *G01F 23/22* (2013.01); *G01F 23/804* (2022.01)

(58) Field of Classification Search
CPC ........ G01F 23/00; G01F 23/804; G01F 23/22; G01F 13/001; G01F 13/006
See application file for complete search history.

(56) References Cited

U.S. PATENT DOCUMENTS

| | | | | |
|---|---|---|---|---|
| 5,301,873 A * | 4/1994 | Burke | .................. | G01F 23/804 123/179.8 |
| 6,341,629 B1 * | 1/2002 | Clark | ..................... | B67D 7/342 141/59 |

(Continued)

FOREIGN PATENT DOCUMENTS

| | | | | |
|---|---|---|---|---|
| CN | 111995138 A | 11/2020 | | |
| WO | WO-2020205543 A1 * | 10/2020 | ......... | G01F 23/2962 |

OTHER PUBLICATIONS

International Search Report and Written Opinion for Application No. PCT/US2023/022348, dated Aug. 30, 2023 (10 pages).

*Primary Examiner* — Oluseye Iwarere
(74) *Attorney, Agent, or Firm* — Michael Best & Friedrich LLP

(57) ABSTRACT

Methods for monitoring an amount of a non-liquid product within a chemical delivery system may include determining a valve opening duration for the emission of the non-liquid product, comparing the valve opening duration to a vessel full on time, and, when a difference between the valve opening duration and the vessel full on time exceeds a predetermined threshold, sending a low product level alert. A system for monitoring an amount of non-liquid product may include a chemical delivery system, a control valve in fluid communication with a water system, and a control unit. The control unit may be programmed to: determine an opening duration of the control valve, determine a vessel full on time, compare the opening duration to the vessel full on time, and, when a difference between the opening duration and the vessel full on time exceeds a predetermined threshold, send an alert to an alert device.

19 Claims, 4 Drawing Sheets

(56) References Cited

U.S. PATENT DOCUMENTS

| | | | | |
|---|---|---|---|---|
| 2007/0224708 | A1* | 9/2007 | Krishnan | F16K 37/0091 438/5 |
| 2007/0251597 | A1* | 11/2007 | Breithaupt | B67C 3/20 141/94 |
| 2008/0009977 | A1 | 1/2008 | Krishnan et al. | |
| 2013/0098003 | A1 | 4/2013 | Pietraszek | |
| 2018/0251713 | A1 | 9/2018 | Angelescu et al. | |

* cited by examiner

SYSTEMS, METHODS AND TECHNIQUES FOR NON-LIQUID MATERIAL MONITORING

CROSS-REFERENCE TO RELATED APPLICATION(S)

This application claims priority to U.S. Provisional Patent Application No. 63/342,385, filed on May 16, 2022, the entire contents of which are fully incorporated herein by reference.

FIELD

The instant disclosure relates to systems, methods and techniques for monitoring an amount of chemical material in a delivery system. More particularly, exemplary aspects relate to non-liquid chemical material delivery systems.

SUMMARY

In one aspect, a method for monitoring an amount of a non-liquid product within a chemical delivery system is disclosed. Exemplary methods may include determining a valve opening duration for the emission of the non-liquid product, comparing the valve opening duration to a vessel full on time, and, when a difference between the valve opening duration and the vessel full on time exceeds a predetermined threshold, sending a low product level alert.

In another aspect, a system for monitoring an amount of non-liquid product is disclosed. Exemplary systems may include a chemical delivery system, a control valve in fluid communication with a water system, and a control unit. The control unit may be programmed to: determine an opening duration of the control valve, determine a vessel full on time, compare the opening duration to the vessel full on time, and, when a difference between the opening duration and the vessel full on time exceeds a predetermined threshold, send an alert to an alert device.

Other aspects of the application will become apparent by consideration of the detailed description and accompanying drawings.

Figure 1:
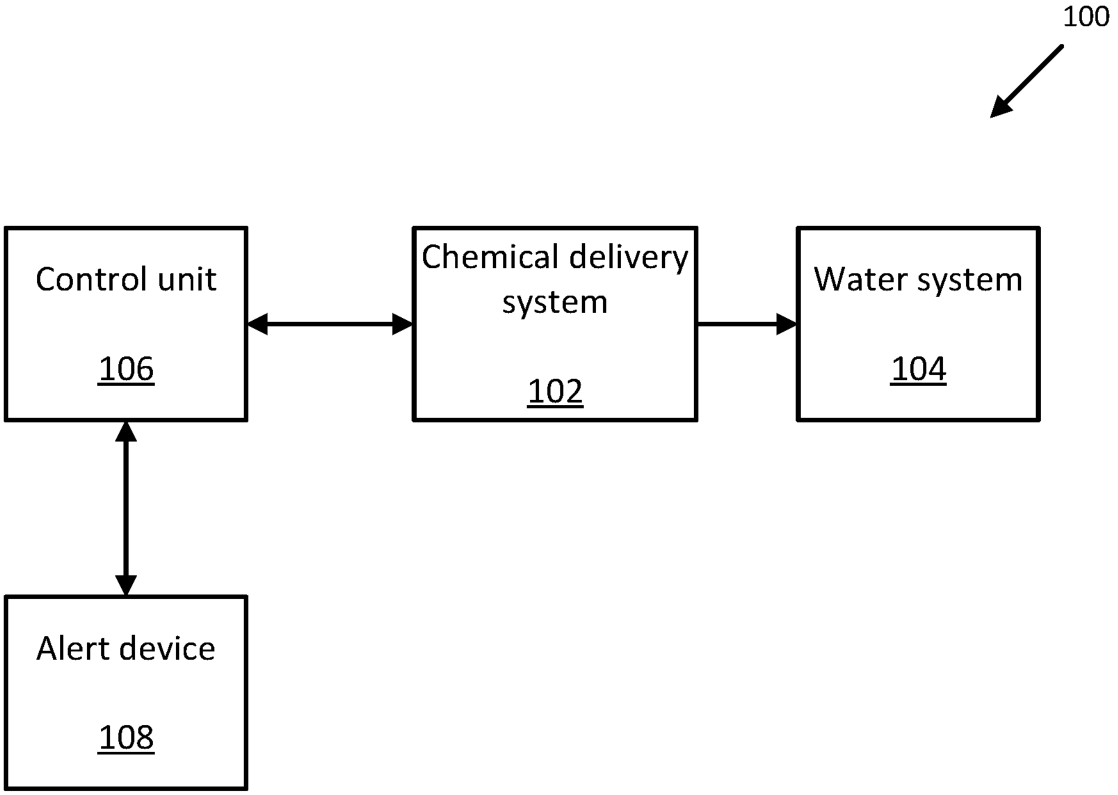
FIG. 1 is a schematic diagram of an exemplary system for monitoring an amount of non-liquid product.

Before any embodiments of the application are explained in detail, it is to be understood that the application is not limited in its application to the details of construction and the arrangement of components set forth in the following description or illustrated in the drawings. The application is capable of other embodiments and of being practiced or of being carried out in various ways.

DETAILED DESCRIPTION

Exemplary systems, methods and techniques disclosed herein generally relate to monitoring amounts of non-liquid material. Traditional methods of monitoring liquid chemistries may not be effective or accurate for non-liquid material.

During exemplary operations, as an amount of non-liquid material in a delivery system decreases, a concentration of the non-liquid material within the delivery system becomes more dilute. As the concentration becomes more dilute, an amount of time to satisfy a demand for the non-liquid material increases. Exemplary aspects disclosed herein may utilize these performance attributes to enable monitoring amounts of non-liquid material in chemical delivery systems.

FIG. 1 shows a schematic diagram of an exemplary system 100. System 100 includes chemical delivery system 102, water system 104, control unit 106, and alert device 108. As shown, control unit 106 is in communication with chemical delivery system 102, which is in fluid communication with water system 104. Control unit 106 may communicate with an alert device 108, for instance, when a supply of one or more chemical materials falls below a predetermined threshold. Other embodiments may include more or fewer components.

Chemical delivery system 102 provides one or more chemical materials to water system 104. In various implementations, chemical delivery system 102 may comprise a single feeder assembly or multiple feeder assemblies configured to dose the one or more chemical materials. Exemplary chemical delivery systems 102 may comprise one or more timers, controllers, historians, data loggers, valves, pumps, eductors, and/or control orifices.

Exemplary embodiments comprising multiple feeder assemblies may be arranged in serial or in parallel. Commercially available examples of feeder assemblies include the Smart Release Technology sold by Dober Chemical Corp. (Woodridge, IL).

Exemplary chemicals provided by chemical delivery system 102 are stored as non-liquid material. In some instances, non-liquid material may be pastes, granules, tablets, coated tablets, and/or gases.

Various types of chemicals may be provided by chemical delivery system 102. In some instances, chemical delivery system 102 may provide one or more treatment chemicals. For instance, exemplary chemicals provided to water system 104 may be biocides, coagulants, flocculants, scale inhibitors, corrosion inhibitors, and/or chelants.

In some instances, chemical delivery system 102 may provide chemicals comprising one or more treatment chemicals and one or more tracer compounds. In some instances, exemplary tracer compounds may be detectable by a fluorometer. An exemplary tracer compound that is commercially available is 1,3,6,8-pyrenetetrasulfonic acid tetrasodium salt hydrate (PTSA). Exemplary tracer compounds may include tagged polymers and oxidizer monitors. Other types of chemicals are contemplated.

In some implementations, chemical delivery system 102 may dose one or more chemicals to water system 104. Chemical delivery system 102 may comprise one or more control valves that open and close to selectively release chemical material into a stream of water system 104. In some instances, chemical material may be diluted prior to dosing into a stream of water system 104.

In some implementations, some, most or all of the fluid in water system 104 may circulate through chemical delivery system 102.

Various types of water systems 104 may be used in exemplary system 100. As examples, water system 104 may be a cooling tower system, a boiler water system, an industrial water system, a wastewater system, a thermal energy system, and/or a power generation system.

Exemplary water system 104 employs a flow stream comprising an aqueous fluid. The aqueous fluid may comprise one or more chemicals and/or one or more solids that may be dissolved or suspended. In some implementations, water system 104 may be configured as a loop, where the aqueous fluid circulates through one or more units.

Water system 104 may comprise one or more sensor units configured to monitor concentrations of one or more chemical species in the aqueous fluid. Exemplary sensor units may be positioned downstream or upstream of chemical delivery system 102. Exemplary sensor units may be in communication with control unit 106. In various implementations, exemplary sensor units may include water meters, sensors, detectors, photometers, auto titrators, and/or analyzers.

Control unit 106 communicates with chemical delivery system 102 and alert device 108. Generally, control unit 106 includes at least one processing device, such as a central processing unit (CPU). A variety of processing devices are available from a variety of manufacturers, for example, Intel, Texas Instruments, or Advanced Micro Devices. In some instances, control unit 106 may be a preprogrammed microprocessor or a system on a chip.

Control unit 106 may also include a memory device and a system bus that couples various system components, such as the memory device to the processing device. A memory device can include read only memory (ROM), random access memory (RAM), other non-transitory computer-readable media, or a combination thereof. The processing device is configured to receive instructions and data from the memory and execute, among other things, instructions related to operation of chemical delivery system 102. In particular, the processing device executes instructions stored in the memory to perform exemplary methods described herein.

A basic input/output system including the basic routines that act to transfer information within control unit 106, such as during start up, may be stored in the read only memory. The system bus is one of any number of types of bus structures including a memory bus or memory controller, a peripheral bus, and a local bus using any of a variety of bus architectures.

In some embodiments, control unit 106 includes input devices to enable a user to provide inputs to the control unit 106. Examples of input devices include a touch-sensitive display device, such as a liquid crystal display (LCD).

In some instances, control unit 106 may receive inputs via wired or wireless connection a user device (not shown). Control unit 106 may include a wireless module including an antenna which enables communication via a network (not shown). In some embodiments, the wireless communication link may be, but is not limited to, a radio frequency (RF) communications link, a Bluetooth communications link, and a Wi-Fi communications link. Additionally, in some embodiments, the wireless communication link may be part of a local area network (LAN), a neighborhood area network (NAN), a home area network (HAN), or personal area network (PAN). In yet another embodiment, the wireless communication link may be part of a wide area network (WAN) (e.g., the Internet, a TCP/IP based network, or a cellular network).

The control unit 106 typically includes at least some form of computer-readable media. Computer readable media includes any available media that can be accessed by the control unit 106. By way of example, computer-readable media include computer readable storage media and computer readable communication media.

A number of program modules can be stored in a secondary storage device or the memory device, including an operating system, one or more application programs, other program modules, and program data. The data used by the control unit 106 may be stored at any location in the memory, such as the program data, or at the secondary storage device.

Alert device 108 may provide an alert to a user regarding a quantity of treatment chemical in chemical delivery system 102. In some implementations, alert device 108 may be a computing device accessible by a user, such as a mobile phone, a desktop computing device, or a tablet computing device. In some implementations, alert device 108 may be a display device or a device configured to emit light and/or sound.

Alert device 108 receives communications from control unit 106 regarding an alert status. In some instances, alert device 108 may be in communication with control unit 106 via a network such as the networks described above.

Figure 2:
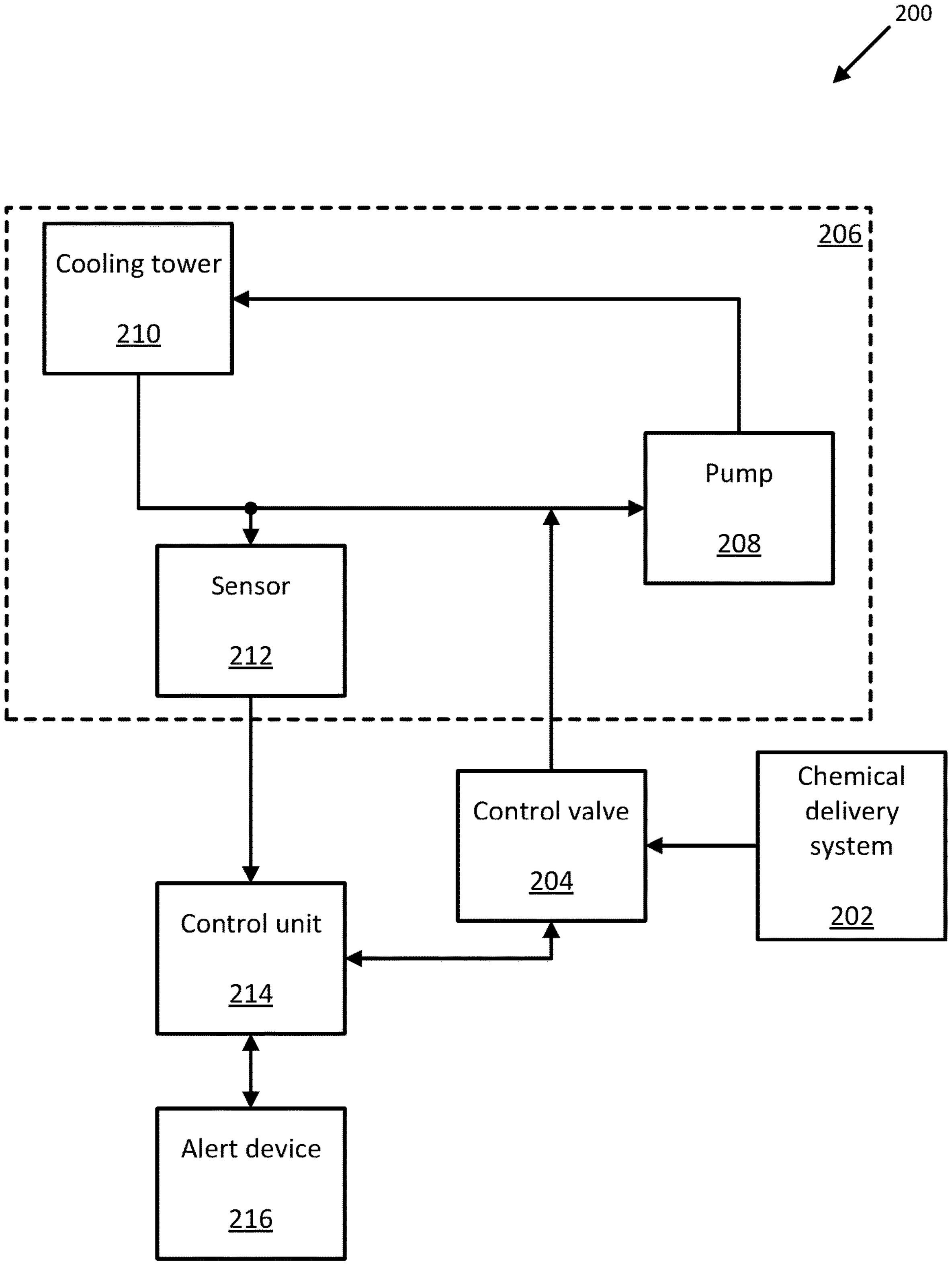
FIG. 2 is a schematic diagram of another exemplary system for monitoring an amount of non-liquid product.

FIG. 2 shows a schematic diagram of an exemplary system 200. As shown, system 200 includes chemical delivery system 202, control valve 204, water system 206, control unit 214, and alert device 216. Water system comprises pump 208, cooling tower 210, and sensor 212. Control valve 204 is in fluid communication with chemical delivery system 202 and water system 206. Control unit 214 is in electrical communication with sensor 212 and control valve 204 via wired and/or wireless connections. Discussion above of various components in system 100 above applies to similarly-named components in system 200. Other embodiments may include more or fewer components.

Water system 206 includes a fluid loop where aqueous fluid flows through cooling tower 210 and is recirculated by pump 208. In some instances, water system 206 may additionally comprise a make-up fluid source, not shown in FIG. 2. The make-up fluid source may provide additional aqueous fluid to the water system 206 loop as needed.

Cooling tower 210 may be any type of cooling equipment known in the art. In some implementations, cooling tower 210 may include air flow inlets, distribution decks/pans, fan units, spray units, tower fills, and tower basins. Aqueous fluid may be provided to the distribution deck and pass through the spray units into the tower fills. After flowing through the tower fills, the aqueous fluid may be collected in the tower basins. Various routing apparatus may fluidly connect the tower basins to the pump 208.

Sensor 212 acquires one or more parameters of the aqueous fluid flowing through water system 206. Generally, system 212 may be positioned such that it may detect one or more chemical materials in the bulk water. As shown, sensor 212 may be positioned downstream of cooling tower 210.

Sensor 212 may comprise one or more measuring devices. Measurement signals obtained by sensor 212 may be provided to control unit 214. Exemplary measuring devices may include a water meter, a photometer, an auto titrator, fluorometer, a colorimeter, and/or a conductivity meter. In some instances, sensor 212 may be a PTSA sensor.

Pump 208 recirculates aqueous fluid through water system 206. In some instances, pump 208 may comprise more than one pump. Various types of fluid pumps known in the art, suitably configured, may be used.

Control valve 204 is in fluid communication with chemical delivery system 202 and may selectively provide one or more chemical materials to water system 206. In the embodiment shown, control valve 204 provides chemical materials downstream from cooling tower 210.

In some implementations, control valve 204 comprises multiple valves, where each valve provides a different chemical material. Various types of control valves known in the art may be used as control valve 204.

Control unit 214 may send signals or communications to control valve 204 regarding opening and closing the valve. When control unit 214 determines that an amount of chemical material in chemical delivery system 202 is below a predetermined threshold, control unit 214 may send a signal to alert device 216.

Control unit 214 may monitor the concentration of various chemical species in water system 206 via sensor 212. In some instances, control unit 214 may vary an amount of time that control valve 204 is open in relation to measured concentrations of one or more chemical species in water system 206. Exemplary operations performed by control unit 214 are discussed in greater detail with reference to FIG. 3 below.

Figure 3:
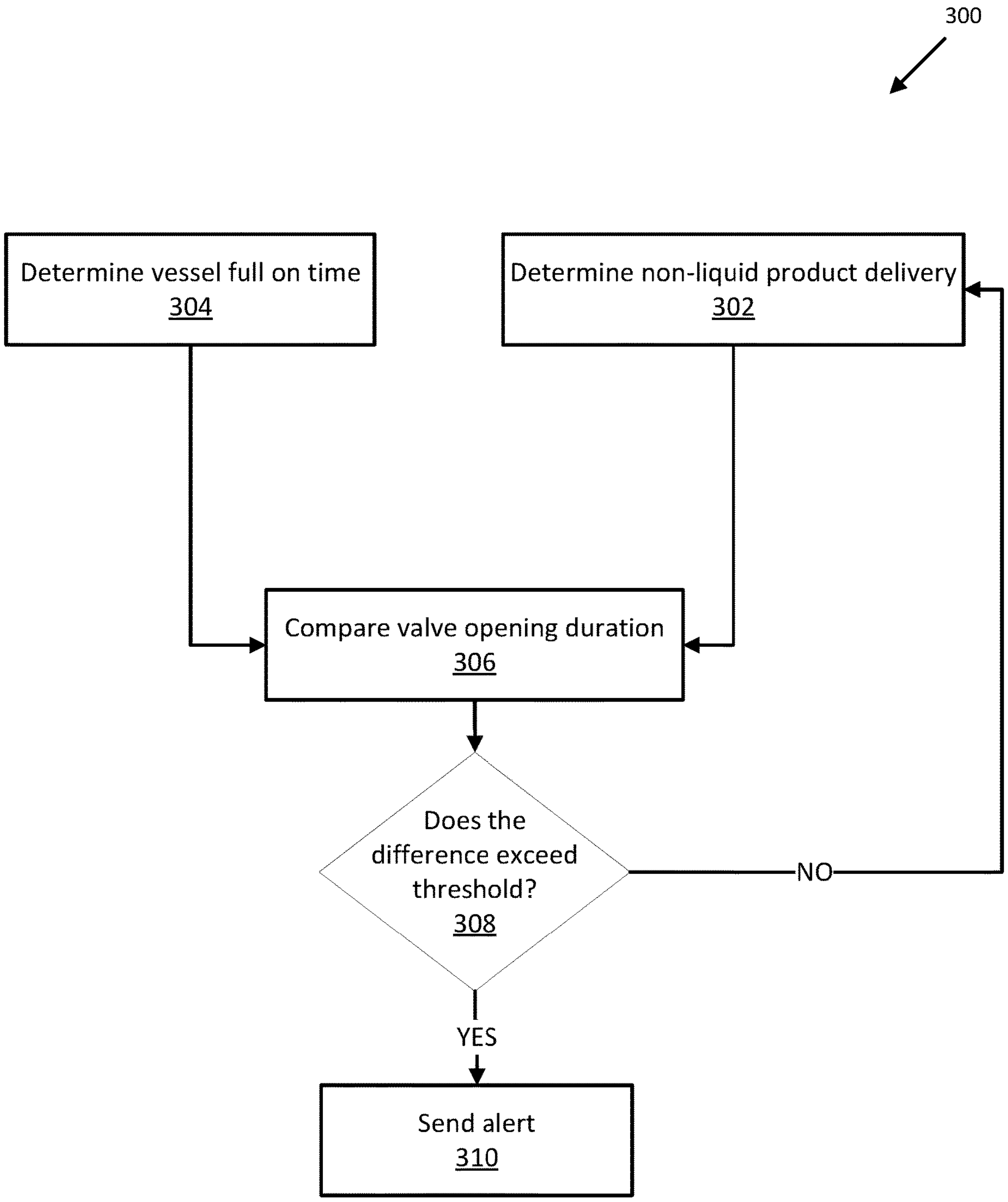
FIG. 3 is an exemplary method for monitoring an amount of non-liquid product.

FIG. 3 shows an exemplary method 300 for monitoring an amount of chemical material in a delivery system. As shown, method 300 includes determining a non-liquid product delivery (operation 302), determining a vessel full on time (operation 304), comparing a valve opening duration (operation 306), determining whether the valve opening duration exceeds a threshold (operation 308), and sending an alert (operation 310). A control unit, such as control unit 106 or control unit 214, may perform some or all operations in method 300. Other embodiments may include more or fewer operations.

One or more start-up operations may be performed prior to execution of method 300. For instance, a chemical material product may be loaded into a delivery vessel feeder. As discussed in greater detail above, the chemical material product is a non-liquid form. The delivery vessel feeder may also be positioned into service. In some instances, one or more chemical species' concentrations may be monitored using sensor readings from a sensor unit.

Method 300 may begin by determining non-liquid product has been provided (operation 302) by a delivery system. In some implementations, a control unit may send a signal or communication to a control valve to effectuate when the control valve opens to deliver non-liquid product and for how long the control valve stays open. In some instances, a time that the control valve opened and a time that the control valve closed may be recorded. Using the opening and closing times, a duration or interval of non-liquid product delivery may be determined. In some instances, a time that the control valve opened and an interval that the valve was open may be recorded. In some instances, a user may notify a software application that a feeder has been filled.

A vessel full on time is also determined (operation 304). The "vessel full on time," as used herein, is a time required to meet system demand for the non-liquid product. The vessel full on time may be determined by averaging the control valve open duration for one or more activations over a time period.

In some instances, the number of activations used to determine the vessel full on time may be 1 activation. In some instances, the number of activations used to determine the vessel full on time may be between 4-8 activations; between 5-7 activations; between 4-6 activations; or between 6-8 activations. In various implementations, the number of activations used to determine the vessel full on time may be at least 4 activations; at least 5 activations; at least 6 activations; at least 7 activations; or at least 8 activations. In various implementations, the number of activations used to determine the vessel full on time may be no more than 8 activations; no more than 7 activations; no more than 6 activations; no more than 5 activations; or no more than 4 activations.

In some instances, the time period used for determining the vessel full on time may be between 12 hours and 96 hours; between 12 hours and 24 hours; between 48 hours and 96 hours; between 48 hours and 72 hours; between 60 hours and 84 hours; or between 72 hours and 96 hours. In various instances, the time period used for determining the vessel full on time may be at least 12 hours; at least 24 hours; at least 36 hours; at least 48 hours; at least 60 hours; at least 72 hours; at least 84 hours; or at least 96 hours. In various instances, the time period used for determining the vessel full on time may be no more than 96 hours; no more than 84 hours; no more than 72 hours; no more than 60 hours; no more than 48 hours; no more than 36 hours; no more than 24 hours; or no more than 12 hours.

The valve opening duration for a particular dosing is compared to the vessel full on time (operation 306). Generally, as an amount of non-liquid product in the chemical delivery system decreases, the control valve remains open for longer periods of time. Operation 306 may involve determining a difference between the valve open duration and the vessel full on time (termed "activation duration difference").

A determination may then be made about whether the difference between the valve open duration and the vessel full on time exceeds a predetermined threshold (operation 308). Various thresholds may be used. For example, the predetermined threshold may be between 4 times (4× or 400%) and 8× the vessel full on time; between 4× and 6× the vessel full on time; between 5× and 7× the vessel full on time; or between 6× and 8× the vessel full on time. In various implementations, the predetermined threshold may be at least 4× the vessel full on time; at least 5× the vessel full on time; at least 6× the vessel full on time; at least 7× the vessel full on time; or at least 8× the vessel full on time. In various implementations, the predetermined threshold may be no more than 8× the vessel full on time; no more than 7× the vessel full on time; no more than 6× the vessel full on time; no more than 5× the vessel full on time; or no more than 4× the vessel full on time.

In some instances, a moving average of one or more previous activation duration differences may be compared during operation 308. For instance, the activation duration difference value of the most recent product delivery may be averaged with a given number of previous activation duration difference values. Then, the average activation duration difference value is compared to the predetermined threshold. In various implementations, the previous 1, 2, 3, 4, 5, or 6 activation duration difference values may be used when calculating the average.

If the activation duration difference exceeds the predetermined threshold, then one or more alert signals or communications are sent (operation 310). The alert signal or communication may be sent to an alert device via wired or wireless connection. As discussed in greater detail above, in various implementations the alert device may be a computing device. As discussed in greater detail above, in various implementations the alert device may be a device configured to emit light and/or sound.

If the activation duration difference does not exceed the predetermined threshold, then example method 300 monitors for another non-liquid product delivery.

Prophetic Experimental Example

A prophetic experimental example implemented various aspects of the exemplary systems and methods discussed above, and the prophetic results are discussed below.

Ten pounds (10 lbs.) of non-liquid product were loaded into a feeder apparatus. The feeder apparatus was in fluid communication with a cooling tower system. An alert threshold was set to be 6× of the vessel full on time.

The feeder apparatus was put into service at 10 am on Day 1. A control unit activated a control valve to provide the non-liquid product on Day 1 at the following times and for the following durations: 12:00 pm for 11 seconds; 1:45 pm for 9 seconds; 2:45 pm for 9 seconds; 5:20 pm for 8 seconds; and 11:30 pm for 9 seconds. On Day 2, an activation occurred at 5:10 am for 9 seconds. Using those six activation durations, the vessel full on time was set to be 9 seconds.

A control unit continued to monitor control valve activations and record the duration of each valve opening. A moving average was used, where the current activation was averaged with the previous two activations.

After a certain number of activations, the moving average of the valve opening duration was 55 seconds, which exceeded the 6× threshold. An alert was sent to a computing device associated with an operator. The operator opened the feed vessel and evaluated the non-liquid product amount. The evaluation determined whether the amount of non-liquid product was nearing exhaustion, in which case the product would be replenished and the 6× threshold maintained. However, if the evaluation determined that the non-liquid product was not nearing exhaustion, the threshold would be increased.

Figure 4:
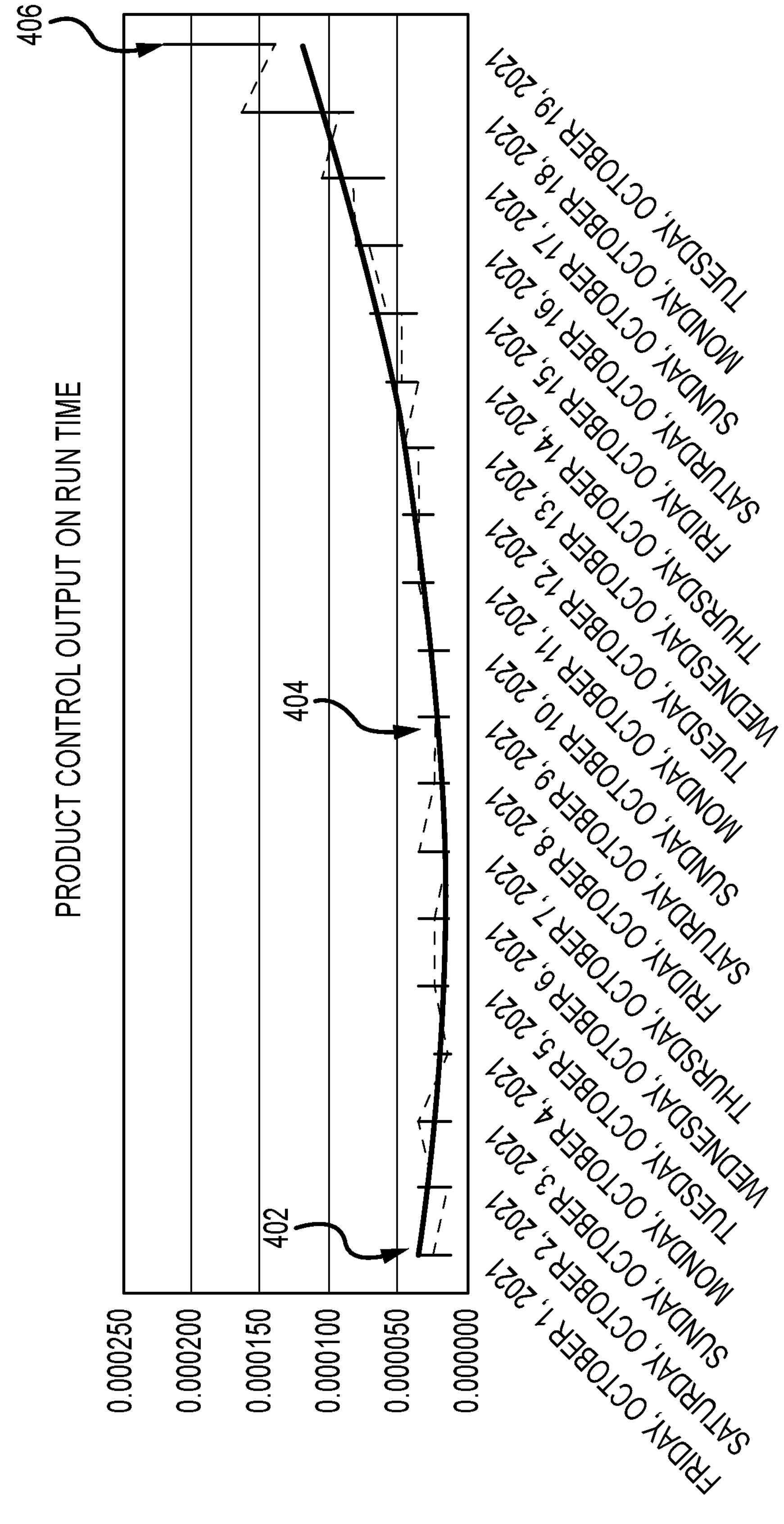
FIG. 4 is a graph showing a prophetic experimental example of emission duration for a non-liquid product.

FIG. 4 is a graph of an actual experimental example. The y-axis in FIG. 4 is time in fractional hours, which may be used as a relative number, and the x axis is in days. The solid line shows a trend line for time on and the dots are actual time on. The non-liquid product delivery system is filled at 402. It can be seen that starting around 404, the amount of on time (that is, the time the control valve is open) increases. The delivery system is exhausted of non-liquid product at 406.

What is claimed is:

1. A method for monitoring an amount of a non-liquid product within a chemical delivery system, the method comprising:

initiating, by an electronic controller, a dosing event by operating a control valve to release the non-liquid product into a fluid stream;

receiving, by the electronic controller, a sensor signal from at least one sensor positioned to measure a property of the fluid stream corresponding to a concentration of the non-liquid product;

determining, by the electronic controller based on the sensor signal, a measured concentration of the non-liquid product in the fluid stream during the dosing event;

controlling, by the electronic controller, the control valve to conclude the dosing event by closing the control valve and stopping the release of the non-liquid product into the fluid stream in response to the measured concentration of the non-liquid product satisfying a dosing condition;

determining, by the electronic controller, a valve opening duration for the dosing event corresponding to a total time that the control valve remains open during the dosing event;

comparing, by the electronic controller, the valve opening duration to a vessel full on time; and when a difference between the valve opening duration and the vessel full on time exceeds a predetermined threshold, sending, by the electronic controller, a low product level alert.

2. The method according to claim 1, wherein the vessel full on time is determined using between 4 to 8 dosing events.

3. The method according to claim 1, wherein the vessel full on time is determined using 1 dosing events.

4. The method according to claim 1, wherein the vessel full on time is determined using dosing events during a time period between 12 hours and 96 hours.

5. The method according to claim 1, wherein the vessel full on time is determined using dosing events during a time period between 48 hours and 72 hours.

6. The method according to claim 1, wherein the predetermined threshold is between 4 times and 8 times the vessel full on time.

7. The method according to claim 6, wherein the predetermined threshold is between 4 times and 6 times the vessel full on time.

8. The method according to claim 1, wherein a plurality of differences between the valve opening duration and the vessel full on time are averaged, and the average difference between the valve opening duration and the vessel full on time is compared to the predetermined threshold.

9. The method according to claim 8, wherein between 1 and 6 previous dosing events are used to calculate the average.

10. The method according to claim 1, wherein the valve opening duration is determined using a valve opening time for the control valve and a valve closing time for the control valve.

11. A system for monitoring an amount of non-liquid product, the system comprising:

a chemical delivery system;

a control valve in fluid communication with a fluid system;

at least one sensor positioned to measure a property of the fluid system corresponding to a concentration of the non-liquid product; and an electronic controller, the electronic controller being programmed to:

initiate a dosing event by operating the control valve to release non-liquid product into the fluid system;

receive a sensor signal from the at least one sensor;

determine, based on the sensor signal, a measured concentration of the non-liquid product in the fluid system during the dosing event;

control the control valve to conclude the dosing event by closing the control valve and stopping the release of the non-liquid product into the fluid system in response to the measured concentration of the non-liquid product satisfying a dosing condition;

determine an opening duration of the control valve during the dosing event, the valve opening duration corresponding to a total time that the control valve remains open during the dosing event;

determine a vessel full on time;

compare the opening duration to the vessel full on time; and when a difference between the opening duration and the vessel full on time exceeds a predetermined threshold, send an alert to an alert device.

12. The system according to claim 11, wherein the vessel full on time is determined using between 4 to 8 dosing events.

13. The system according to claim 11, wherein the vessel full on time is determined using dosing events during a time period between 12 hours and 96 hours.

14. The system according to claim 13, wherein the vessel full on time is determined using dosing events during a time period between 48 hours and 72 hours.

15. The system according to claim 13, wherein the predetermined threshold is between 4 times and 8 times the vessel full on time.

16. The system according to claim 15, wherein the predetermined threshold is between 4 times and 6 times the vessel full on time.

17. The system according to claim 11, wherein a plurality of differences between the valve opening duration and the vessel full on time are averaged, and the average difference between the valve opening duration and the vessel full on time is compared to the predetermined threshold.

18. The system according to claim 17, wherein between 1 and 6 previous dosing events are used to calculate the average.

19. The system according to claim 11, wherein the valve opening duration is determined using a valve opening time for the control valve and a valve closing time for the control valve.

* * * * *